United States Patent [19]

Cutler et al.

[11] Patent Number: 4,664,634

[45] Date of Patent: May 12, 1987

[54] ELECTRIC SELF-TEACHING APPARATUS UTILIZING PRINTED AND AUDITORY MEANS

[76] Inventors: Stanley Cutler; Burton Cutler, both of 150 W. Carob St., Compton, Calif. 90220

[21] Appl. No.: 778,014

[22] Filed: Sep. 20, 1985

[51] Int. Cl.[4] .............................................. G09B 5/06
[52] U.S. Cl. .................... 434/311; 434/318; 434/339; 200/159 B
[58] Field of Search ............... 434/308, 309, 311, 312, 434/313, 317, 318, 339; 200/5 A, 159 B

[56] References Cited

U.S. PATENT DOCUMENTS

| | | | |
|---|---|---|---|
| 2,603,006 | 7/1952 | MacChesney et al. | 434/311 |
| 3,106,027 | 10/1963 | Thelin | 434/339 |
| 3,396,478 | 8/1968 | Genin | 434/312 |
| 3,771,240 | 11/1973 | Matui | 434/339 |
| 3,952,170 | 4/1976 | Irvin et al. | 369/256 X |
| 4,300,029 | 11/1981 | Maser | 200/159 B |
| 4,302,647 | 11/1981 | Kandler et al. | 200/159 B |
| 4,434,480 | 2/1984 | Fukumitsu | 369/77.2 |

*Primary Examiner*—William H. Grieb
*Attorney, Agent, or Firm*—Roger A. Marrs

[57] ABSTRACT

Self-teaching apparatus is disclosed herein having a platform for supporting a card carrying printed indicia and a record disc. Information carried on the disc and the printed area is coordinated so as to be meaningful in practice. Record disc playback mechanism and an operating circuit is intercoupled with an electrical probe actuator so that the auditory instructions or information can be related to the printed indicia. In one form, a solid, pliable platform is employed with a membrane switch included in the circuit and, in another form, holes are placed through the platform for passing an electric tip on the probe for contact with a plate connected to the circuit. The card is provided with holes in the latter form and without holes in the former form.

11 Claims, 9 Drawing Figures

ELECTRIC SELF-TEACHING APPARATUS UTILIZING PRINTED AND AUDITORY MEANS

BACKGROUND OF THE INVENTION

1. Field of the Invention

The present invention relates to electric teaching apparatus and, more particularly, to a novel such apparatus correlating printed information on a card with auditory information carried on a record disc.

2. Brief Description of the Prior Art

In the past, most electric self-teaching or self-testing systems employ a sensing device consisting of a pin or probe intended to be pierced through one or more of a plurality of overlay sheet members or pressed upon at a selected area of a work or overlay sheet placed upon a responsive means. The device further includes a signaling means such as a lamp connected with the normally open circuit of the sensing and responsive devices. The circuit is closed by the pin or probe and the lamp is lit only when the correct answer has been selected by the user. It will be readily understood that with this type of system, the user is only informed of whether the answer he has selected is correct or not. Moreover, as the user gets accustomed to his sensing device, it has been quite possible that he will, by memory, learn the entire arrangement of correct answer areas and depress these areas with the probe regardless of the indicia or answer information carried on the uppermost or visually displayed overlay sheet.

Attempts have been made to improve self-teaching machines or devices of this type by incorporating a membrane switching system which may be operated from any number of predetermined locations in a planar area and utilizes a plurality of locations on an overlay sheet in a reasonable size area in order to make it difficult for the user to remember locations of correct answers.

Although the above noted conventional devices are operable for their intended purposes, a need exists for including auditory information which is correlated with printed indicia on the faces of the overlay member or card. For example, auditory announcements can be made instructing the user on how to proceed to use the printed indicia or graphic representations. The announcing information and the printed information are related with respect to each other and cooperate to augment the operation, performance and function of the self-teaching device.

SUMMARY OF THE INVENTION

Accordingly, improvements are made by the present invention which provides for a self-teaching device having a body supporting an overlay sheet having graphic representations and/or printed indicia thereon as well as a plurality of target areas intended to be selectively chosen for engagement with a probe or insertion point. Means responsive to the engagement of the probe or insertion point operates to signify meaningful visual and audible information to the user. Additional audible means are carried on a selected end of the overlay sheet to be sensed by a reading or playback means disposed on the body wherein the audible information is correlated with the printed or graphic subject matter.

In one form of the invention, the device employs an overlay card having holes or target areas for insertably passing metallic tips therethrough for electrical engagement with an underlying metal plate coupled into the responsive means. In another form, a non-metallic probe is employed for depressing a target area in order to actuate a membrane switch coupled with the responsive means.

Therefore, it is among the primary objects of the present invention to provide a novel teaching apparatus correlating auditory and printed subject matter so that the user can coordinate the selection of specific areas on an overlay sheet to receive pressure contact for actuation of response circuits.

Another object of the invention is to provide a teaching device having an overlay sheet intended to be depressed or penetrated in certain areas whereby such areas are selected by the coordination of subject matter presented to the user in printed or visual form as well as by vocal or auditory form.

Still another object of the present invention is to provide a teaching system incorporating means for presenting visual information on an overlay sheet and for presenting vocal or auditory information on the overlay sheet which is employed to augment the use of the system.

Yet another object of the present invention is to provide a novel electric teaching apparatus adapted to combine the benefits of both aural and visual information whereby the use of skill or knowledge in conjunction with the aural and visual information is required by the user.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
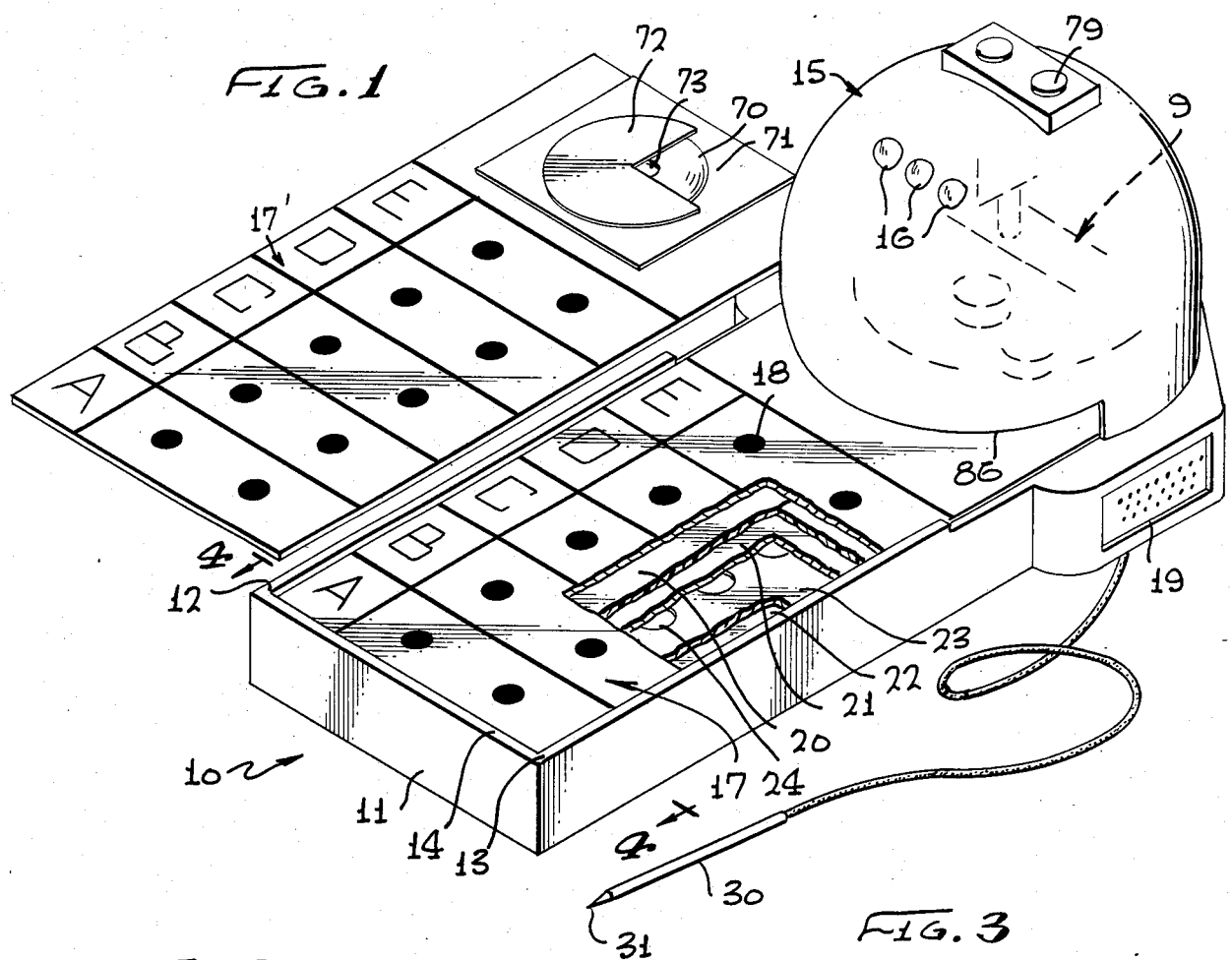
FIG. 1 is a front perspective view showing the novel electric teaching apparatus of the present invention having auditory and printed indicia means incorporating the present invention.

Referring to FIG. 1, a novel teaching apparatus incorporating the present invention is illustrated in the general direction of arrow 10 which incorporates a printed or etched overlay sheet used in combination with an auditory reproducing means. A basic switch utilizing a planar type membrane switch is shown which can be operated from any number of predetermined locations in a planar area carried on the overlay sheet. Practical configurations of the planar type membrane switch include SPST or SPDT types and the switch operates in combination with the printed indicia on the overlay sheet in coordination with the recorded message or data played on the audio reproducing means.

The apparatus 10 includes a body 11 having opposite side walls which terminate in parallel siderails or guides 12 and 13 and an end rail 14. The opposite end of the body 11 includes a housing 15 which encloses batteries, lights, audio reproducing means 9, a loudspeaker 19 and inner connecting circuitry. For example, three lights may be used and a typical light is indicated by numeral 16. An open area is defined between the opposing surfaces of the side walls 13, 12, 14, and housing 15 which is occupied by a planar membrane switch. However, in another version, an electric contact probe and contact plate is used with a perforated sheet. The teaching system includes an indicia sheet or card 17 having a plurality of indicia, graphic subject matter or the like displayed on at least one side or surface thereof which is exposed to the view of the user. In the present instance, indicia carried on the exposed surface of the card or sheet includes a plurality of printed dots such as dot 18 which are placed in predetermined locations thereon. It is to be noted that the invention depicted in FIGS. 1 and 2 does not contemplate holes or apertures in the sheet or card 17 and that printed or etched indicia is employed. For example, the dot 18 may be printed and it represents a circular dot about ⅛ of an inch in diameter. The card or sheet 17 rests on the flat surface of an outer layer of the membrane type switch which is identified by numeral 20. The overlay card or sheet 17 is usually printed on one side only since usable hole locations as employed in the prior art will operate from both sides of the overlay and are therefore limited. By employing the overlay card or sheet of the present invention, indicia can be printed on both sides with complete independence of "correct answer" locations on either side. Also, it is to be particularly understood that in accordance with the present invention, no holes or specifically located indicia is carried on the surface of the membrane 20 on which the overlay card 17 rests. Decorative indicia, pictorial or other graphic subject matter may be carried on the surface so that when exposed by removal of the overlay card from the cavity or opening defined by the body, it will reveal such decorative subject matter. However, it is to be understood that such subject matter does not relate to the operation of the switch or involve the process of teaching.

Preferably, the switch assembly includes two conductive coatings or layers of metal such as aluminum laminated to paper or plastic and separated by an insulating layer. The two conductive layers are identified by numerals 21 and 22 while the insulating layer is identified by numeral 23. The insulator can be a plastic film such as mylar or acetate or it can even be composed of paper. Holes or apertures are cut in the insulating layer 23 at locations corresponding to the correct answer which is in direct registry with a selected indicia dot such as dot 18 carried on the overlay sheet 17. Such a hole or aperture in the insulating layer is identified by numeral 24. By this construction, the two aluminum foil surfaces opposing one another from layers 21 and 22 can be urged into engaging contact with each other when pressure is applied at the correct answer dot 18 printed on the exposed surface of the overlay card or sheet 17. One surface of the outer layer of aluminum foil 21 is adhered to the underside of the mylar membrane or layer 20 which will insure that the switch opens when the pressure is removed therefrom due to the inherent restoring memory of the material. The position of the hole 24 is considered critical and must correspond with the printed dots on the overlay learning card or sheet. Accuracy of registration or indexing of the dots with the respective holes can be accurately obtained by cutting the overlay card or sheet to fit the opposing walls of the body side rails and end rail 14 and housing 15. Spaced rectangular cut outs along the side walls will allow an adhesive attachment of the edge marginal region of the outer membrane 20 to stick or adhere to the body side walls.

The aluminum layers 21 and 22 constitute contact plates and may take the form of metal coating aluminum foil or foil laminated to paper or plastic. The contact plate 22 fastens to the body 11 with adhesive applied between the underside of the contact plate and the top side of the body 11. This relationship is shown more clearly in FIG. 2 and FIG. 3 wherein it can be seen that the dot 18 is in alignment with the hole 24 and that contact plate 22 is adjacent to the supporting structure of the body 11. The contact plate 21 is composed of the same material as contact plate 22 and fastens with adhesive to the underside of the membrane 20. Position of the contact layer is not critical. However, electrical connection is required for both contact plates.

Figure 2:
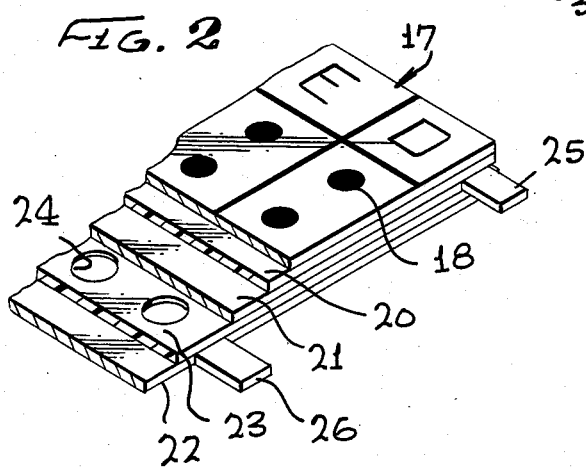
FIG. 2 is an enlarged fragmentary view of a layered planar type membrane switch construction used in the apparatus of FIG. 1 taking the form of a SPST switch configuration.
Figure 3:
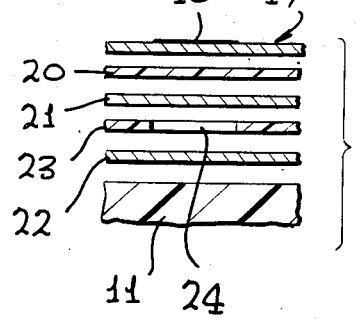
FIG. 3 is an enlarged fragmentary cross-sectional view of the layered construction utilized in the planar switch shown in FIG. 2.

Referring further to FIG. 2, electrical connection is made with the contact plates 21 and 22 via tabs 25 and 26 which extend from the extreme end of the respective contact plates. These tabs may be used for connection into a suitable circuit such as the circuit shown in FIG. 4 comprising a battery 27 and an indicator such as a light 28 serving as a load. Each tab may be formed to a desired punched shape or each tab may be constructed by using a fine wire which is zigzagged and taped to the foil surface.

Figure 4:
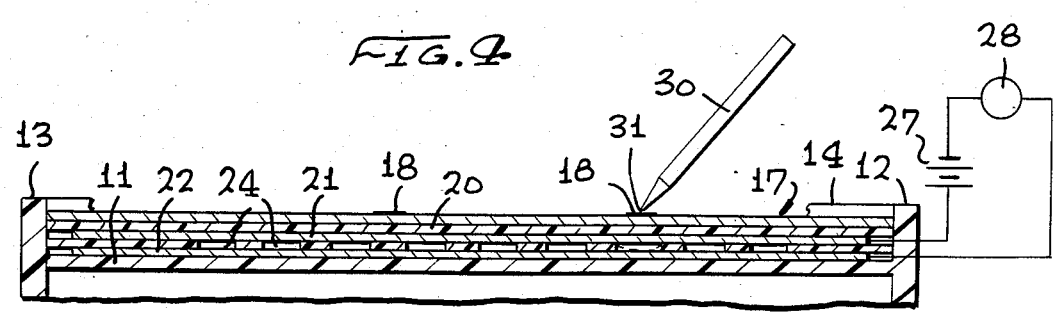
FIG. 4 is an enlarged transverse cross-sectional view of the electric teaching apparatus as shown in FIG. 1 as taken in the direction of arrows 4—4 thereof.

Referring to FIGS. 1 and 4, a simple non-electric probe 30 having a hard rubber tip 31 is pressed by the user against a selected circular dot 18. No wire or electrical connection is coupled to the probe and the probe is employed for applying mechanical pressure through the overlay card or sheet 17 to the membrane switch.

The hardness of the rubber tipped probe is chosen so that it does not significantly mark positions where it frequently touches so that the user will not have any subsequent clues as to the correct or wrong answer. Also, the user's finger may be used for depression in place of the probe.

In FIG. 4, it can be seen that a downward pressure on the probe 30 forcibly urges the membrane 20 and its contact plate 21 through the hole 24 so that the opposing surface of the contact plate 21 engages mechanically and electrically with the surface of contact plate 22. Such contact completes the electrical circuit and current will flow through the lamp 28. Thus, a "correct" signal is given to the user. The mylar or other plastic film composition of the outer membrane 20 exhibits characteristics of a good memory and when the pressure is released, the membrane will assume its original flat configuration withdrawing the contact plate 21 back through the opening 24 out of contact with contact plate 22. In one form of the invention, the outer membrane 12 constructed within the range of 0.005 inch to 0.010 inch in thickness.

The switch as shown in FIG. 4 is of a SPST type and provides a signal for a correct answer, but gives no response for a wrong answer. With slight modification, the switch can provide signal A for right answers and signal B for wrong answers. The switch now becomes a SPDT type where the membrane foil layer 20 is the pole and an intermediate foil layer and the lower foil layer become the ultimate contacts FIGS. 7 and 8 disclose such a switch.

Figure 7:
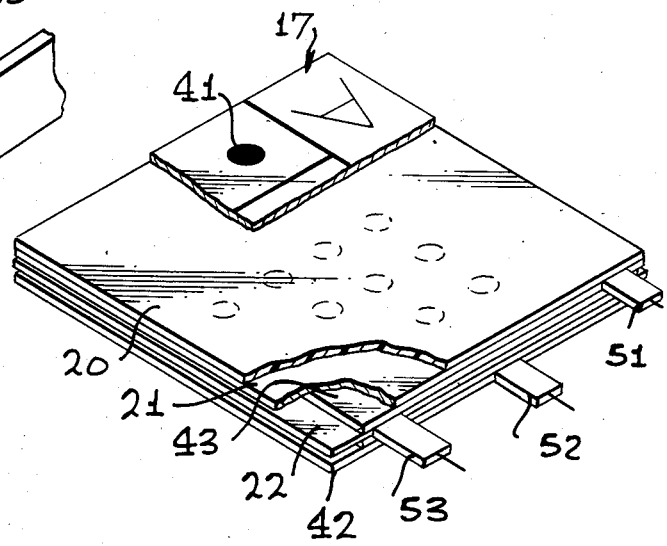
FIG. 7 is a view similar to the view of FIG. 4 illustrating a modification of the present invention wherein the switch construction takes the form of a switch configuration of the SPDT type.
Figure 8:
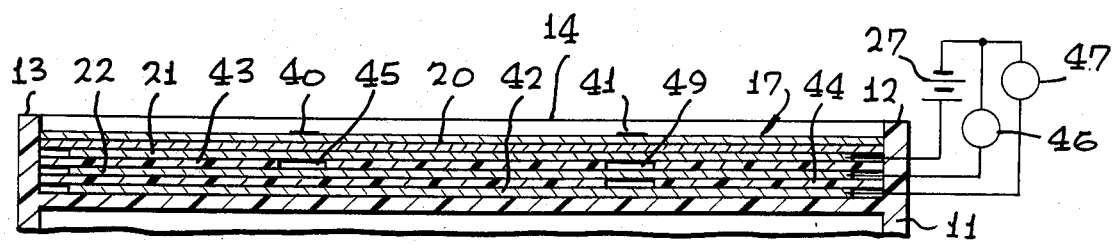
FIG. 8 is a front perspective view of the layered construction forming the membrane switch shown in FIG. 7.

Referring now in detail to FIGS. 7 and 8, the planar SPDT membrane switch is illustrated incorporating the overlay card or sheet 17 carrying a variety of indicia, graphic and pictorial subject matter and including spots such as printed disks indicated by numerals 40 and 41 on its exposed surface. Also, a membrane layer of flexible composition 20 is employed. However, the membrane switch has been modified to include an additional contact plate so that a total of three are illustrated by numerals 21, 22 and the additional contact plate 42. Insulating layers 43 and 44 are disposed between adjacent contact plates and the entire membrane switch rests on the rigid backing plate of base 11. A hole 45 is placed in the insulation layer 43 indexed and registered in coaxial alignment with the printed dot 40 carried on the overlay sheet 17. Therefore, when pressure is applied to printed dot 40, the membrane layer 20 yieldably moves so that contact plate 21 will engage with contact plate 22 so that an indicator light 46 will be energized. However, when pressure is applied to printed dot 41 in line with holes provided in layer 43, contact plate 22 and insulative layer 44, the contact plate 21 will engage with contact plate 42 to ignite light 47. In this latter instance, it is to be noted that the hole 48 in the contact plate 22 is of larger diameter than the respective holes 49 and 50 in the adjacent insulative layers. Thus, when depression occurs there will be no chance of the contact plate 21 touching the edges of the contact plate 22. As previously described, when pressure is released, the membrane 20 will return to its original flat configuration and contact between any engaging contact plates will be broken.

Connection tabs 51, 52 and 53 outwardly project from the end of the respective contact plates so that electrical connection can be made to the light or other signal circuit.

Therefore, it can be seen from the foregoing that the basic switch of the present invention is a planar type membrane switch which can be operated from any number of predetermined locations taking the form of printed dots on an overlay sheet in a planar area. Practical configurations are illustrated which may be of switch type known as SPST or SPDT. Although the closing positions are predetermined, they are undisclosed to the user of the instrument or device having the switch provided thereon. Therefore, the use of skill or knowledge is required in conjunction with a printed overlay 17. This provides the user with a choice of locations marked on the overlay, some of which can represent correct answers to questions printed on the overlay and others which mark wrong answers. Enough locations can be provided in a reasonable size area to make it difficult for the user to remember positions of correct answers. The user may readily use either the non-electrical probe 30 or his finger for closing the switch by manually placing the probe or his finger onto a selected printed spot followed by physically depressing the spot so as to physically distort the flexible membrane 20 which carries one of the contact plates thereon. The contact plate which may be an aluminum foil is a very inexpensive material and depends on the memory characteristic of the membrane layer to return to its flat state after being distorted by pressing on its surface. This action assures that the switch will open when the probe or finger pressure is removed. Also, it is to be understood that the overlay card or sheet 17 may be readily removed from the area between the side walls and end walls of the device for replacement purposes. The then exposed surface of the membrane 20 is visible to the user; however, since no holes or other indication is provided of correct answer locations or switch closures, the user cannot gain advantage by looking underneath the overlay card as a help or aid in locating correct answers. In fact, it is preferred that the membrane layer 20 be composed of an opaque material and that graphic or pictorial material be placed on the surface of the member which may be decorative or informative but which does not relate to the subject matter or questions or answers contained on the overlay sheet.

Figure 6:
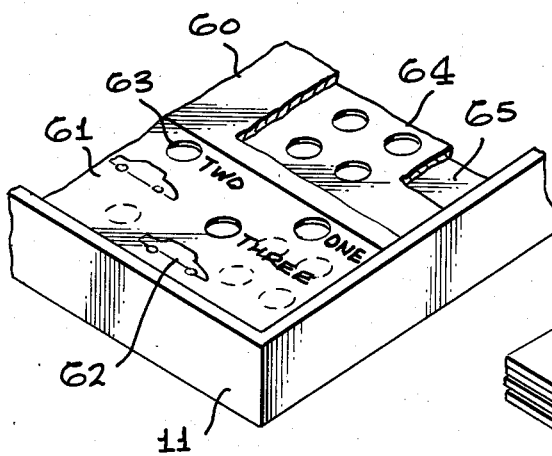
FIG. 6 is a fragmentary perspective view of another embodiment employing an overlay sheet intended to be punctured or penetrated by an electric probe.

Referring to FIG. 6, another overlay sheet is illustrated for use in combination with apparatus 10 and the vocal or auditory system utilizing the sound reproducing means 9. The alternate overlay sheet is indicated by reference numeral 60 and carries several blocks or squares such as square 61. Each square includes graphic representations, such as "car" 62 and a plurality of holes 63 adjacent to indicia relating the holes to the graphic representations. Beneath the overlay sheet 60 is an aperture number 64 covering an electrical contact plate 65. The probe 30 includes an electrical tip 31 that is intended to be placed in physical contact with plate 65 via any one of the selected holes 63. However, in the illustration, only the hole adjacent to the indicia "two" will make electrical contact to operate the signal means coupled to the contact plate representing the correct answer.

Figure 5:
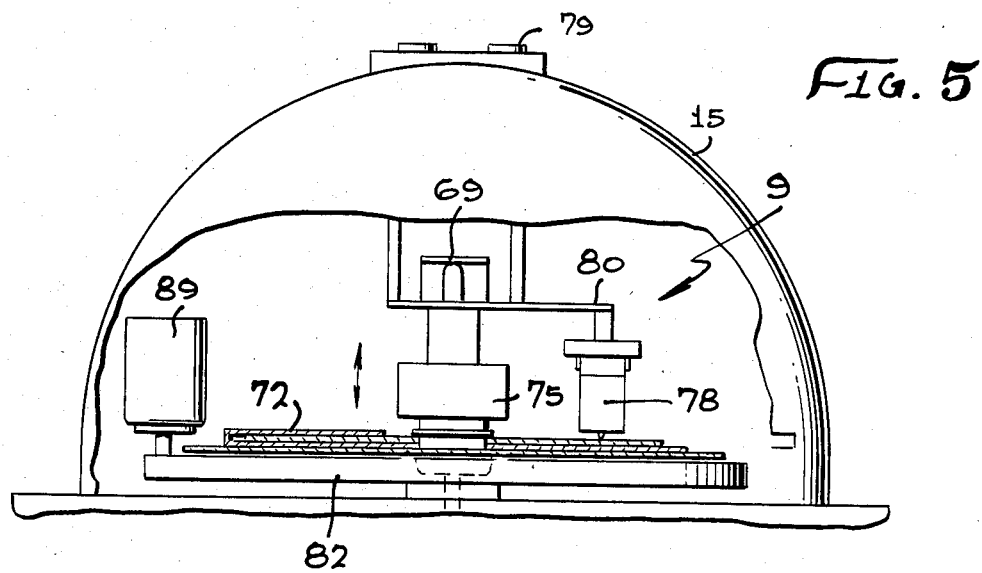
FIG. 5 is a front elevational view of the teaching apparatus shown in FIG. 1 having a portion broken away to illustrate the audio means.
Figure 9:
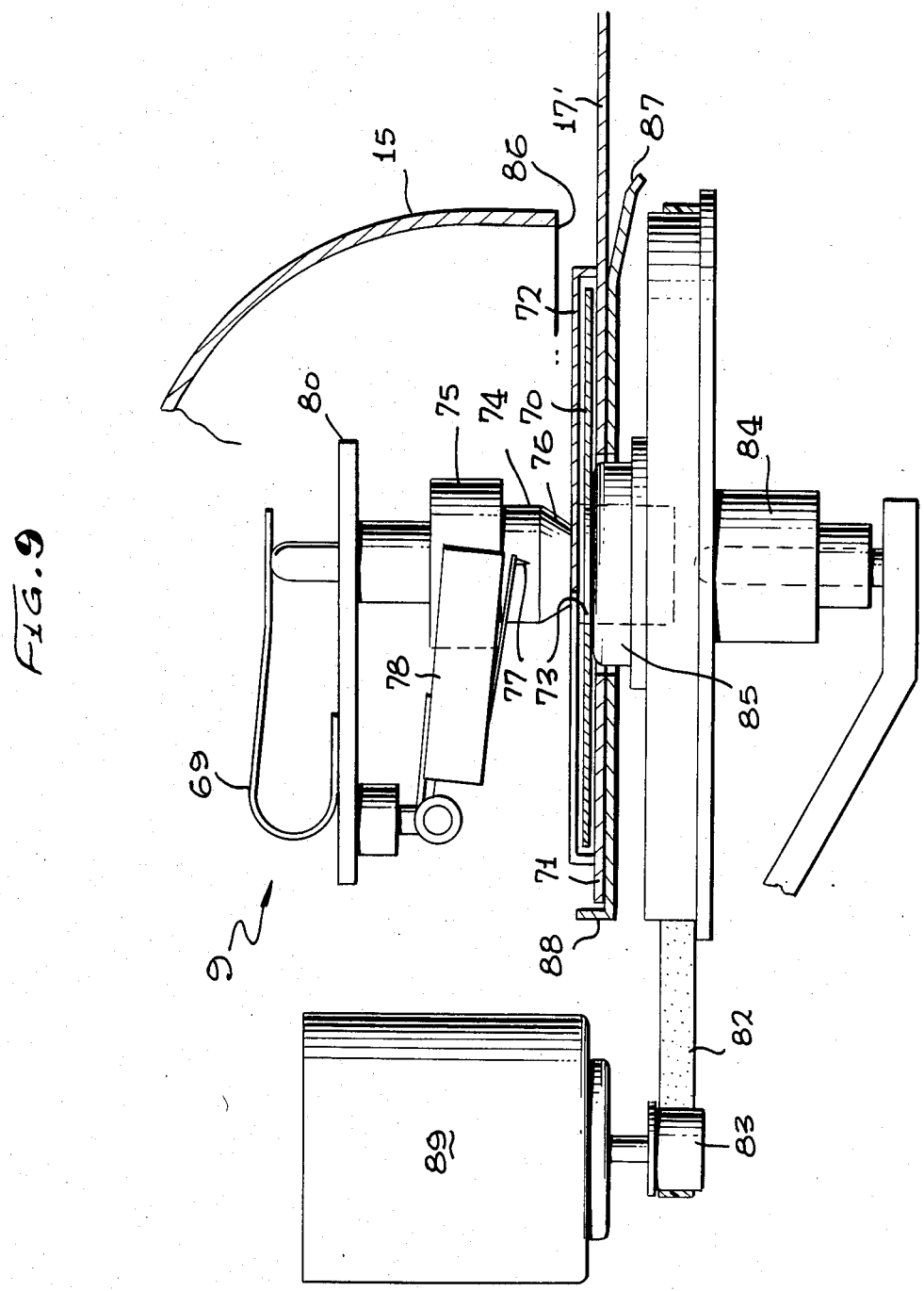
FIGURE 9 is a sectional view of the apparatus housing illustrating the audio reproducing means used in conjunction with the record medium related to graphics or indicia displayed on the overlay card or sheet.

Referring now in detail to FIGS. 1, 5, and 9, it can be seen that the apparatus 10 includes an auditory or sound reproducing means 9 that takes information from a record disc 70 that is rotatably carried on a card or overlay sheet 17' by a retainer-envelope comprising a base 71 and a notched member 72. The base is secured to one end of the card 17' and the disk 70 rotates in a recess between the opposing surfaces of the member 72 and the base 71. The notch opening of the member is of such dimension to allow access to the recorded grooves on the record while fully retaining the record in the envelope. The disk is provided with a central opening 73 for insertably receiving an indexing and gripping nub or core 74 that is carried on a vertically movable mount 75. The core terminates in a conical tip 76 adapted to enter the disk hole 73 when the mount 75 is lowered and to loosely engage with the record disk to apply a downward pressure thereon.

Recorded information is carried in a spiral groove on the record disk in a conventional manner and reproduction is made via engagement of a stylus 77 with the recorded groove on the disk. The stylus is mounted on a cartridge 78 which is pivotally depending from a platform 80. The platform is normally biased by spring 69 upwardly away from the disk. However, upon depression of an "on" button 79, the platform is lowered causing the core 74 to loosely grip the disk defining hole 73 and causing the stylus to engage with the groove of the disk.

The disk is driven by means of a motor 89 via a drive belt 82 trained about a pulley 83 that moves a drive wheel 84 and a record disk grip 85. The pressure of the core against the disk urges the disk against the record grip.

An elongated slot 86 in the housing 15 insertably accepts the leading edge of the card 17' and the card is directed interiorly of the housing by a guide 87 which terminates in a stop flange 88.

The pick-up including stylus and cartridge are electronically coupled to the loudspeaker 19 via conventional amplifier circuits.

In view of the foregoing, it can be seen that the teaching apparatus 10 incorporates both printed graphic and indicia which is used in combination with audio sounds derived from the reproducing means 9. The record means in the form of a recorded disk 70 is carried on a selected end of the overlay sheet 17' and is inserted through the slot 86 into the position shown by numeral 17 in FIG. 1. The sidewalls 12, 13, and 14, as well as guide 87, register the overlay card or sheet on the body so that the record disk is in position to be engaged by the stylus 77 and pressure core tip 76 when lowered.

The audio output from the loudspeaker augments the printed data on the sheet by providing vocal, aural or any other audio information to be used in correlating the printed data. Through conventional circuitry, vocal, aural and auditory announcements and remarks are provided to the user for use in combination with the graphic indicia on the apparatus overlay sheet when either the membrane switch and non-electrical probe are depressed or the electrical probe and contact plate type switch is closed. It is to be understood that the illustrated device employs a revolving record disk and a stationary reproducing means; however, a stationary record disk and a revolving reproducing means can be utilized.

While particular embodiments of the present invention have been shown and described, it will be obvious to those skilled in the art that changes and modifications may be made without departing from this invention in its broader aspect, and, therefore, the aim in the appended claims is to cover all such changes and modifications as fall within the true spirit and scope of this invention.

What is claimed is:

1. A self-teaching apparatus combining correlated audio and visual data comprising:
   a housing;
   sound reproducing means operably mounted in said housing;
   an information sheet displaying visual indicia;
   recorded sound means carried on a selected portion of said information sheet;
   guide means disposed on said housing for insertably receiving said sheet selected portion so as to dispose said sound reproducing means in a playing position;
   said sound reproducing means being responsive to said recorded sound means for audibly providing audio data in correlation to said visual indicia;
   said recorded sound means is a record disk rotatably mounted in an apertured envelope secured to said selected portion on said information sheet;
   said sound reproducing means includes a stylus selectively disposed for engaging with said record disk;
   said sound reproducing means further includes pressure means selectively displaceable to engage said record disk for rotatably driving said record disk;
   said housing includes a slot for insertably receiving said selected portion of said information sheet so that said record disk is covered thereby leaving said visual indicia external of said housing;
   said housing includes an elongated body base having a flat planar support;
   said sheet constitutes an overlay sheet removably disposed on said flat support; and
   switch means cooperating with said flat support and said visual indicia defining an electrical signal means.

2. The invention as defined in claim 1 including:
   said switching means includes a planar membrane switch device carried on said planar support;
   said overlay sheet removably disposed on said membrane switch having at least one surface carrying selected indicia including a plurality of touch points arranged in fixed spaced apart relationship;
   said membrane switch comprising a pliable, resilient layer supporting said overlay sheet and characterized as being deformable upon application of pressure to a selected portion thereof;
   at least a pair of flat, planar contact plates disposed in parallel relationship adjacent to said pliable layer opposite to its side supporting said overlay sheet;
   an insulative layer disposed between said pair of contact plates and having a plurality of openings therein in registration with selected ones of said plurality of said overlay sheet touch points;
   said electrical signal means operably coupled between said contact plates; and
   manual means adapted to forcibly urge deformation of said pliable, resilient layer at a selected one of said touch points for urging a portion of said contact plates together in mechanical and electrical engagement via adjacent insulative layer openings to establish energization of said electrical signal means.

3. The invention as defined in claim 2 wherein:
   said pliable resilient support is opaque and includes a surface supporting said overlay sheet which carries indicia nonrelated to said indicia carried on said overlay sheet.

4. The invention as defined in claim 3 wherein:
   said contact plates are composed of thin metallic layers secured to opposing surfaces of said pliable resilient support and said body base support.

5. The invention as defined in claim 4 including:
   guide means incorporated into said body base for releasably retaining said overlay sheet in position with said touch points in registered alignment with selected openings in said insulative layer.

6. The invention as defined in claim 5 including:
   a nonelectric probe having a nonabrasive tip adapted for use in applying manual pressure to selected ones of said overlay sheet touch points.

7. The invention as defined in claim 6 including:

an additional contact plate adjacent said pair of contact plates arranged in a stack and an additional insulative layer separating said additional contact plate from said pair of contact plates;

said additional insulative layer having openings in alignment with selected ones of said openings in said first mentioned insulative layer; and said contact plate of said stack disposed between the other two contact plates haveing predetermined openings in register and alignment with said aligned openings in said first mentioned and additional insulative layers.

8. The invention as defined in claim 7 wherein:

the inclusion of said additional contact plate and additional insulative layer constitutes an electrical switch of the SPDT type.

9. The invention as defined in claim 1 wherein:

said switching means includes an electrical probe and an electrical contact plate adapted to generate an electrical signal when closure is made therebetween;

an apertured member disposed over said contact plate;

said overlay sheet removably disposed on said apertured member carrying selected indicia including a plurality of locations to be penetrated by said electrical probe; and said switch means responsive to closure of said electrical probe with said contact plate via given penetrated ones of said locations for generating said electrical signal.

10. The invention as defined in claim 9 wherein:

said given ones of said locations are openings in said overlay sheet disposed immediately adjacent said indicia.

11. The invention as defined in claim 10 wherein:

said selected indicia includes graphic representations as well as said penetratable indicia or holes in said overlay sheet.

* * * * *